J. B. HENDERSON.
GYRO COMPASS.
APPLICATION FILED JAN. 22, 1917.

1,226,882.

Patented May 22, 1917.
2 SHEETS—SHEET 1.

INVENTOR:
J. B. HENDERSON:
by Edward Williams
HIS ATTORNEY.

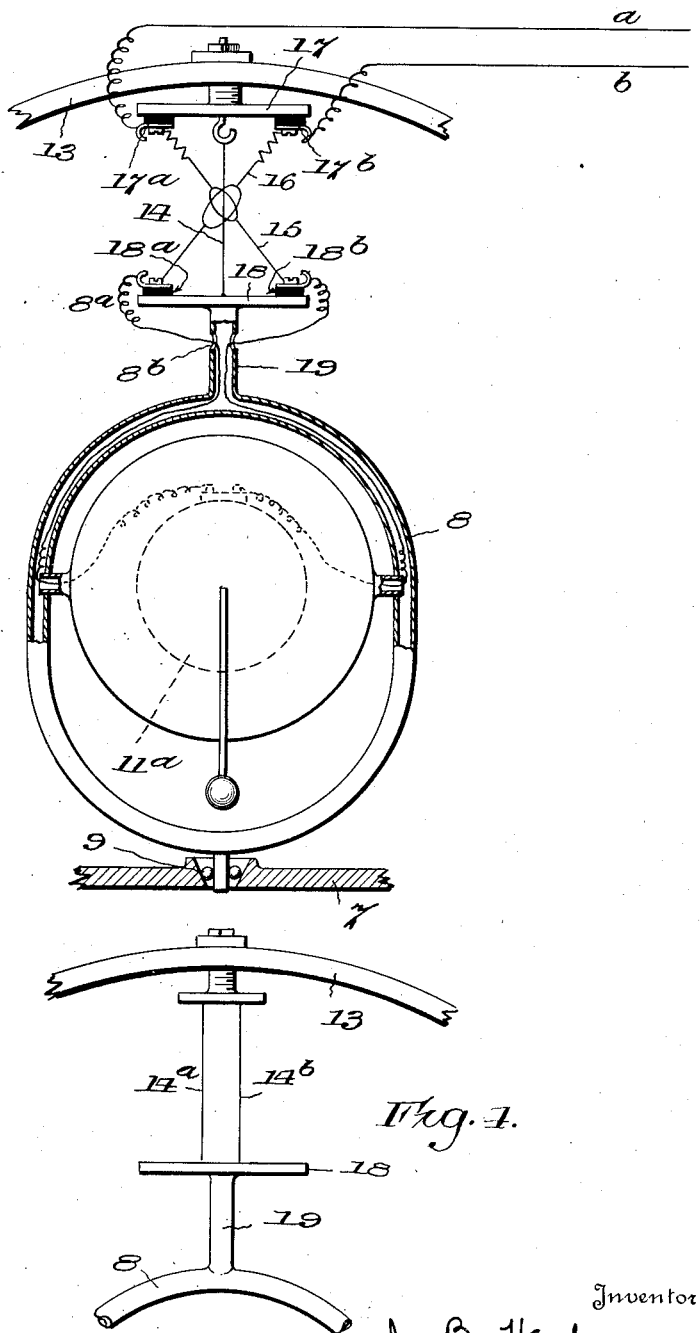

UNITED STATES PATENT OFFICE.

JAMES BLACKLOCK HENDERSON, OF LEE, ENGLAND.

GYRO-COMPASS.

1,226,882.

Specification of Letters Patent.

Patented May 22, 1917.

Application filed January 22, 1917. Serial No. 143,681.

*To all whom it may concern:*

Be it known that I, JAMES BLACKLOCK HENDERSON, a subject of the King of Great Britain, residing at 2 Cambridge road, Lee, in the county of Kent, England, have invented certain new and useful Improvements in Gyro-Compasses, of which the following is a specification.

The objects of my invention are to improve the method of suspending the gyroscope or gyroscopes of the gyro-compass and thereby to improve the methods of damping the oscillations of the compass about the meridian, and to diminish the deviation of the compass due to rolling of the ship on an intercardinal course.

In Foucault's compass the gyro-case was pivoted on horizontal trunnions on a vertical gimbal ring which was suspended by means of a wire. If this gimbal ring were suspended by means of a crossed bifilar suspension instead of by the single wire, it would be torsionally in unstable equilibrium about the vertical axis.

In the present invention I combine the Foucault suspension of the torsion wire with the crossed bifilar suspension, so that the torsional stability or instability can be definitely adjusted. For example if the damping system is confined entirely to the "sensitive element" it is desirable to have no torsional stability or instability in the suspension for small displacements of the "element" in azimuth, whereas if the damping is brought about by a connection between the sensitive element and its support or following mechanism, say by twisting the suspension, it is desirable to be able to adjust the damping couples. Either of these requirements can be fulfilled by means of this trifilar suspension.

To make a practical form of suspension I may provide two of the filars with rings at their point of crossing through which the third filar passes, one ring being larger than the other so as to embrace it. I may give each or any of the filars longitudinal elasticity by incorporating a spiral spring in its length thus making it easier to adjust the proportion of the weight which is borne by each. If each filar of the crossed bifilar suspension has a spring in its length, these filars may be inclined at any angle to the vertical, they may even be horizontal.

In the accompanying diagrammatic drawings illustrating my invention,

Fig. 3 is a diagram illustrating one way in which the filars act as conductors for conveying continuous or other current to the electric motor mounted within the gyroscope.

Fig. 4 is a partial side elevation of a gyro-compass illustrating a parallel bifilar suspension.

Figure 1:
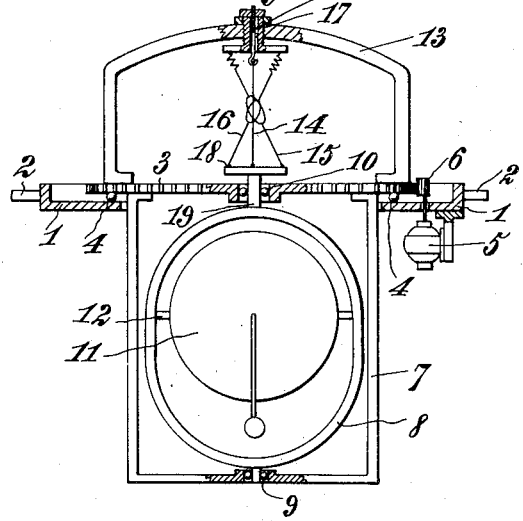
Figure 1 is an elevation in part section of a gyro-compass having a trifilar suspension for the compass.

In Fig. 1 the ring 1 which forms the support for the compass is hung in the ordinary binnacle on the gimbal rings on the trunnions 2. The rir $\therefore$ 1 carries the circular plate 3 on the ball bearing 4. This plate which forms the base of the "following" element is rotated around the vertical central axis by the small motor 5, the pinion 6 on the motor spindle gearing into a circular rack on the periphery of the plate 3. This plate also carries the frame 7 which keeps the sensitive element 8 from swinging pendularly relatively to the plate 3 by means of the bearings 9 and 10. The sensitive element is shown by way of illustration only carrying one gyroscope 11 on horizontal trunnions 12 but it may have two or more. The plate 3 also carries the suspension frame 13 from which the sensitive element is hung.

The suspension consists of a central wire or wires 14 and a crossed bifilar 15 and 16, the elements 15 and 16 having spiral springs incorporated in their lengths. The three suspension elements are attached at the upper end to a torsion head 17 which is adjustable to vary the zero and at the lower end to a T piece 18 attached to the stem 19 of the sensitive element 8. Passing through the torsion head 17 is a telescopic slide 17ª which raises or lowers the central filar thus altering the distribution of weight between the filars, thereby altering the sensitiveness.

The suspension may be used to carry the electric current into the driving motor of the gyro 11. If, for example, the motor is a continuous current motor the ends of two of the suspension elements would be insulated from each other and the current led through these elements by leads passing from their lower ends down through the stem 19 and into the motor by the trunnions 12. If a three phase alternating electric current motor is used for driving the gyroscope all of the three elements of the suspension may be used by insulating the third element from the remainder as just indicated.

The central suspension 14 may sometimes advantageously be a bifilar suspension with the two filars parallel so as to give torsional stability.

Figure 2:
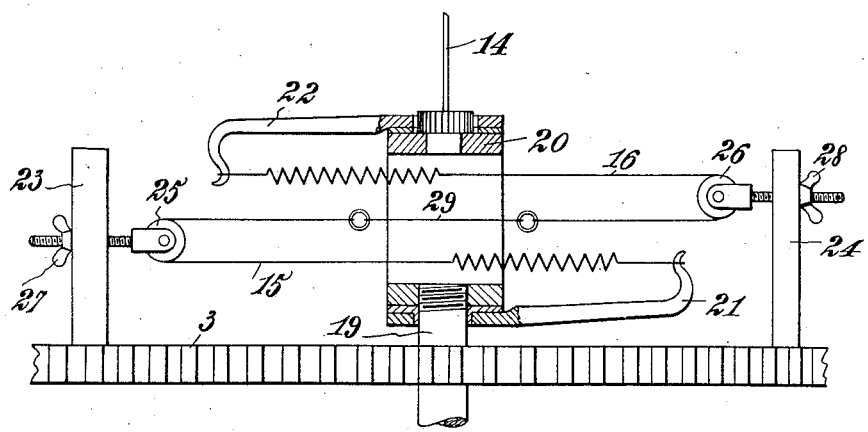
Fig. 2 is a view of a part of a gyro-compass showing an arrangement of suspension in which the two crossed filars are horizontal.

The inclination of the crossed elements 15 and 16 may be varied through wide limits and Fig. 2 shows an arrangement in which they are placed horizontally.

In Fig. 2 the plate 3 and the stem 19 of the sensitive element are shown. The stem 19 is fitted with a ring 20 shown in section. To the top of the ring 20 the central suspension 14 is attached. This ring also carries two insulated hooks 21 and 22 to take the ends of the crossed elements 15 and 16. The other ends of these elements pass over the pulleys 25 and 26 which are supported by the pillars 23 and 24 on the plate 3, and the two elements 15 and 16 are connected by an insulated piece 29 so that there is no electrical connection between them.

In this figure electric current is supplied to the driving motor of the gyroscope from terminal connections made at the wing nuts 27 and 28 through the elements 15 and 16 and through fixed leads (not shown) from the arms 21 and 22 which pass through the stem 19 and trunnions 12 as indicated with reference to Fig. 1. In the case of a three-phase driving motor for the gyroscope a third lead could be taken from the suspension element 14, the latter taking current from a fixed terminal connection fixed to the upper end of the element 14.

The tension in both horizontal filars must be equal because of the pulleys and the magnitude of that tension may be adjusted by the wing nuts 27 and 28. This adjustment is carried out until the requisite minimum amount of torsional stability about the vertical axis is obtained, this minimum depending on the particular system used for damping the oscillation of the compass about the meridian.

The advantage which the above suspension possesses over a unifilar suspension in reducing the deviation of the compass due to rolling of the ship lies in the fact that when the ship is rolling and is on an intercardinal course a pulsating twist is applied to the suspending wire twice during each period of roll, the twists being both in the same sense and of equal amounts. Since the "following" motor must lag somewhat in eliminating this twist, a resultant torque having a vertical axis acts on the gyro due to the torsional stiffness of the suspension and produces a small deviation of the compass. Hence the smaller the torsional stiffness of the suspension the better.

I may employ this suspension with a gyroscope in either stable or unstable equilibrium on its horizontal trunnion axis or with a combination of the two.

In Fig. 3 the suspension frame 13 carries the torsion head 17 which supports on its under side two pieces of insulating material $17^a$ on which are mounted current carrying terminals $17^b$. The upper ends of the filars 15 and 16, respectively, are also connected to the terminals $17^b$. Current is conducted to these terminals by conductors $a$ and $b$ from a source of electrical supply, thence through the filars to terminals $18^b$ mounted on insulating pieces $18^a$ that are secured to the upper side of the T-piece 18. The lower ends of the filars 15 and 16, respectively, are also attached or connected to the terminals $18^b$. Flexible conductors $8^a$ are secured to the terminals $18^b$ and are then passed through a perforation or perforations $8^b$ in the side of the stem 19 of the sensitive element 8, which conductors are then passed down inside of the element 8 and then passed through the hollow trunnions 12 of the gyroscope to the electric motor $11^a$ mounted therein.

In Fig. 4 the central suspension comprises a pair of suspension wires $14^a$, $14^b$, forming a parallel bifilar suspension system that gives additional torsional stability.

What I claim as new and desire to secure by Letters Patent of the United States, is:—

1. A suspension system for the sensitive element of a gyro-compass comprising at least one element giving torsional stability to the sensitive element about its vertical axis, another system of elements giving torsional instability to the sensitive element about its vertical axis, and means for adjusting the relative stability or instability.

2. In a gyro-compass the combination with a sensitive element of a suspension system for said element consisting of at least one vertical filar and a plurality of filars inclined to the vertical.

3. In a gyro-compass the combination with a motor driven sensitive element of a frame from which the sensitive element is suspended by means of filars, a rotatable plate on which the frame is supported, a motor for rotating said plate, the filars being insulated from each other and utilized for leading current from a source to the gyroscope of the sensitive element.

4. In a gyro-compass the combination with a sensitive element of a frame from which the sensitive element is suspended, a torsion head carried by said frame, filars each secured at one end to the torsion head and at the other end to the sensitive element and means for adjusting the torsion head with respect to the frame for setting the zero and means for adjusting the proportion of weight carried by the several filars to vary the stability of the sensitive element.

5. In a gyro-compass, the combination with a sensitive element, a suspension system for said element consisting of a plurality of filars electrically insulated from each other, and means for adjusting the tension of the filars.

6. In a gyro-compass the combination of a gyroscope, a gimbal ring therefor provided with trunnions, a rotatable plate, a bearing carried by said plate adapted to receive one of the gimbal ring trunnions, a frame supported from said plate and having a bearing formed in it adapted to receive the other gimbal ring trunnion, a suspension frame mounted on said plate and suspension mechanism for the gyroscope carried by said frame comprising a central wire and crossed bifilars.

7. In a gyro-compass the combination of a gyroscope, a gimbal ring therefor provided with trunnions, a rotatable plate, a bearing carried by said plate adapted to receive one of the gimbal ring trunnions, a frame supported from said plate and having a bearing formed in it adapted to receive the other gimbal ring trunnion, a suspension frame mounted on said plate and suspension mechanism for the gyroscope carried by said frame comprising a central wire and crossed bifilars, said bifilars each having spiral springs incorporated in their length.

8. In a gyro-compass the combination of a gyroscope, a gimbal ring therefor provided with trunnions, a rotatable plate, a bearing carried by said plate adapted to receive one of the gimbal ring trunnions, a frame supported from said plate and having a bearing formed in it adapted to receive the other gimbal ring trunnion, a suspension frame mounted on said plate and suspension mechanism for the gyroscope carried by said frame comprising a central wire and crossed bifilars, said bifilars having rings incorporated in their length at the point of crossing through which the central wire passes, one of said rings being larger than the other so that it embraces the smaller.

9. In a gyro-compass, the combination with a sensitive element, a suspension system for said element consisting of a plurality of filars, and means for adjusting the tension of the filars.

10. In a gyro-compass, the combination with a sensitive element, a suspension system for said element consisting of a plurality of filars, the filars having means preventing contact between them.

11. In a gyro-compass, the combination with a sensitive element, a suspension system for said element consisting of a plurality of crossing filars, the filars having means preventing contact between them.

12. In a gyro-compass, the combination with a sensitive element, a suspension system for said element consisting of a plurality of filars, the axes of which cross, the cross filars having means preventing contact between them.

13. In a gyro-compass, the combination with a sensitive element and a suspension system for said element consisting of a plurality of filars electrically insulated from each other.

In witness whereof, I have hereunto set my hand this 4th day of January 1917.

JAMES BLACKLOCK HENDERSON.

Witnesses:
 HAROLD BARON,
 PHYLLIS M. IVORY.